United States Patent
Sato et al.

(10) Patent No.: US 8,810,091 B2
(45) Date of Patent: Aug. 19, 2014

(54) STATOR OF ROTATING ELECTRICAL MACHINE HAVING SIGNAL LINE HOLDING PORTIONS

(75) Inventors: Tomohiro Sato, Kariya (JP); Hiroyuki Nagata, Obu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 336 days.

(21) Appl. No.: 13/288,341

(22) Filed: Nov. 3, 2011

(65) Prior Publication Data

US 2012/0112580 A1 May 10, 2012

(30) Foreign Application Priority Data

Nov. 4, 2010 (JP) ................... 2010-247431

(51) Int. Cl.
*H02K 11/00* (2006.01)
(52) U.S. Cl.
USPC .......................... 310/71; 310/68 C
(58) Field of Classification Search
CPC ...................................... H02K 11/00
USPC ................ 310/71, 68 C, 68 B, 68 E
IPC ............................................. H02K 11/00
See application file for complete search history.

(56) References Cited

U.S. PATENT DOCUMENTS

| | | | |
|---|---|---|---|
| 7,180,212 B2 * | 2/2007 | Anwar et al. | 310/71 |
| 7,557,478 B2 * | 7/2009 | Hoshika | 310/71 |
| 2010/0244597 A1 * | 9/2010 | Sugiyama et al. | 310/71 |
| 2012/0111145 A1 * | 5/2012 | Maekawa et al. | 310/71 |

FOREIGN PATENT DOCUMENTS

| | | | |
|---|---|---|---|
| JP | S60-163329 U | 10/1985 | |
| JP | 2010-81742 A | 4/2010 | |
| JP | 2010-141962 A | 6/2010 | |
| JP | 2010141962 A * | 6/2010 | ............ H02K 11/00 |
| JP | 2010-233405 A | 10/2010 | |

OTHER PUBLICATIONS

Machine translation of JP 2010141962 A (published Jun. 24, 2010, translated Jul. 15, 2013).*
Japanese Office Action dated Apr. 22, 2014 issued in the corresponding Japanese Patent Application No. 2010-247431 and English language translation (4 pages).

* cited by examiner

*Primary Examiner* — Michael Andrews
(74) *Attorney, Agent, or Firm* — Buchanan Ingersoll & Rooney P.C.

(57) ABSTRACT

A stator of a rotating electrical machine is provided. The stator includes a core unit which includes plural core assemblies arranged annularly, each core assembly being wound with a coil, plural accommodating portions which are provided to correspond to the core assemblies, each accommodating portion accommodating at least one of (i) a connection portion of end portions of adjacent coils for forming a neutral point and (ii) a connection portion of the other end portion of one of the adjacent coils and a power supply line, a temperature detector which detects at least one of a temperature of an oil and a temperature of a coil of the plural coils, and a signal line which is connected to the temperature detector for transmitting a detection signal from the temperature detector to an outside. Each of the accommodating portions includes a holding portion which holds the signal line.

6 Claims, 14 Drawing Sheets

STATOR OF ROTATING ELECTRICAL MACHINE HAVING SIGNAL LINE HOLDING PORTIONS

CROSS REFERENCE TO RELATED APPLICATIONS

This application is based on and claims priority under 35 U.S.C. §119 to Japanese Patent Application 2010-247431, filed on Nov. 4, 2010, the entire content of which is incorporated herein by reference.

TECHNICAL FIELD

This disclosure relates to a stator of a rotating electrical machine which drives a rotor.

BACKGROUND DISCUSSION

JP-A-2010-141962 describes a stator of a rotating electrical machine having a temperature sensor for detecting a temperature of a stator coil. Specifically, JP-A-2010-141962 describes a technique where a temperature sensing unit of the temperature sensor is inserted into between adjacent coils to detect a temperature in the vicinity of a stator coil.

In general, a sensor wire connected to the temperature sensing unit is drawn around on the small-width stator and then is lead to the outside through a connector or the like. Therefore, in order to prevent the sensor wire from interfering with the rotor or the like through wiring, the sensor wire should be firmly held on the stator. In a case where the rotating electrical machine is mounted on a vehicle, when there is slack in the sensor wire attached to the stator, even if the sensor wire does not interfere with other components, the sensor wire may be broken due to vibration occurring in the vehicle. JP-A-2010-141962 does not describe a specific structure for holding the sensor wire on the stator.

Meanwhile, JP-A-2010-81742 describes a motor having a temperature sensor disposed at a coil end. The temperature sensor is connected to a sensor wire, and the sensor wire has a three-layer structure formed by an electric wire, a heat shrinkage tube, and a protection tube, from an inner side. The sensor wire is disposed at an appropriate position in a motor case, and hot wind is applied to the wiring and the heat shrinkage tube is shrunk, so that the sensor wire is fixed at a predetermined position on the motor case.

In the stator described in JP-A-2010-81742, since hot wind has to be applied to fix the sensor wire, a motor manufacturing process is complicated, and the manufacturing cost increases. Further, the sensor wire has to be formed in the three-layer structure including the heat shrinkage tube. Even from this point, the motor manufacturing cost may further increase.

A need thus exists for a stator of a rotating electrical machine which is not susceptible the drawback mentioned above.

SUMMARY

According to an aspect of this disclosure, there is provided a stator of a rotating electrical machine provided in a housing. The stator comprises: a core unit which includes a plurality of core assemblies arranged annularly, each core assembly being wound with a coil; a plurality of accommodating portions which are provided to correspond to the core assemblies, each accommodating portion accommodating at least one of (i) a connection portion of end portions of adjacent coils for forming a neutral point and (ii) a connection portion of the other end portion of one of the adjacent coils and a power supply line; a temperature detector which detects at least one of a temperature of an oil stored in the housing and a temperature of a coil of the plurality of coils; and a signal line which is connected to the temperature detector for transmitting a detection signal from the temperature detector to an outside, wherein each of the accommodating portions includes a holding portion which holds the signal line.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

<First Embodiment>

Figure 1:
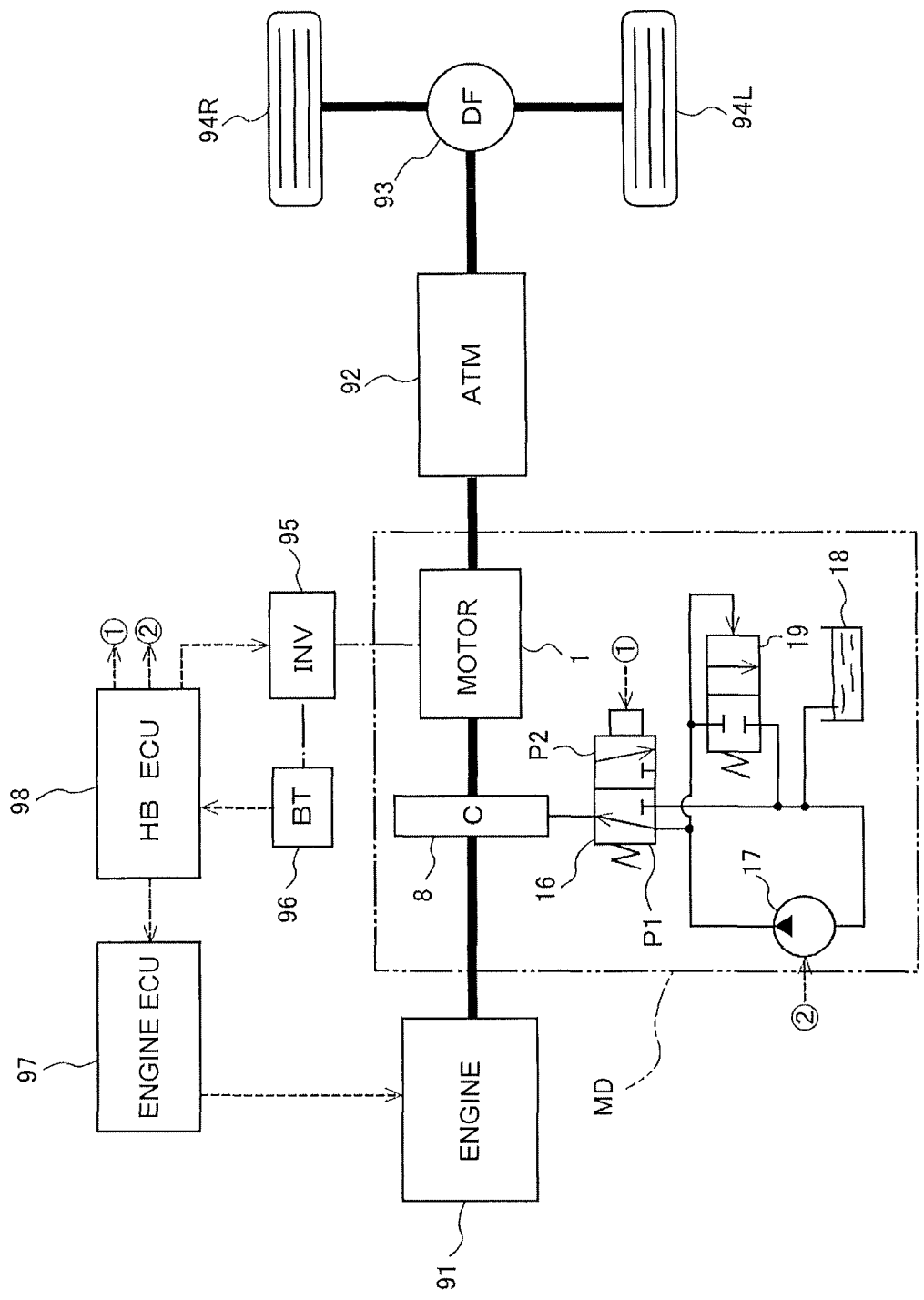
FIG. 1 is a view illustrating a drive system of a vehicle using an electric motor according to a first embodiment disclosed here.

A stator 3 of an electric motor 1 according to a first embodiment disclosed here will be described with reference to FIGS. 1 to 21.

The electric motor 1 (an example of a rotating electrical machine) according to the first embodiment is a synchronous motor for driving wheels of a hybrid vehicle, and is interposed between a clutch device 8 connected to an engine 91 and a transmission 92. However, the electric motor 1 is not limited thereto, and may be any electric motor such as a motor installed in a home electric appliance or a motor for driving a general industrial machine.

Figure 2:
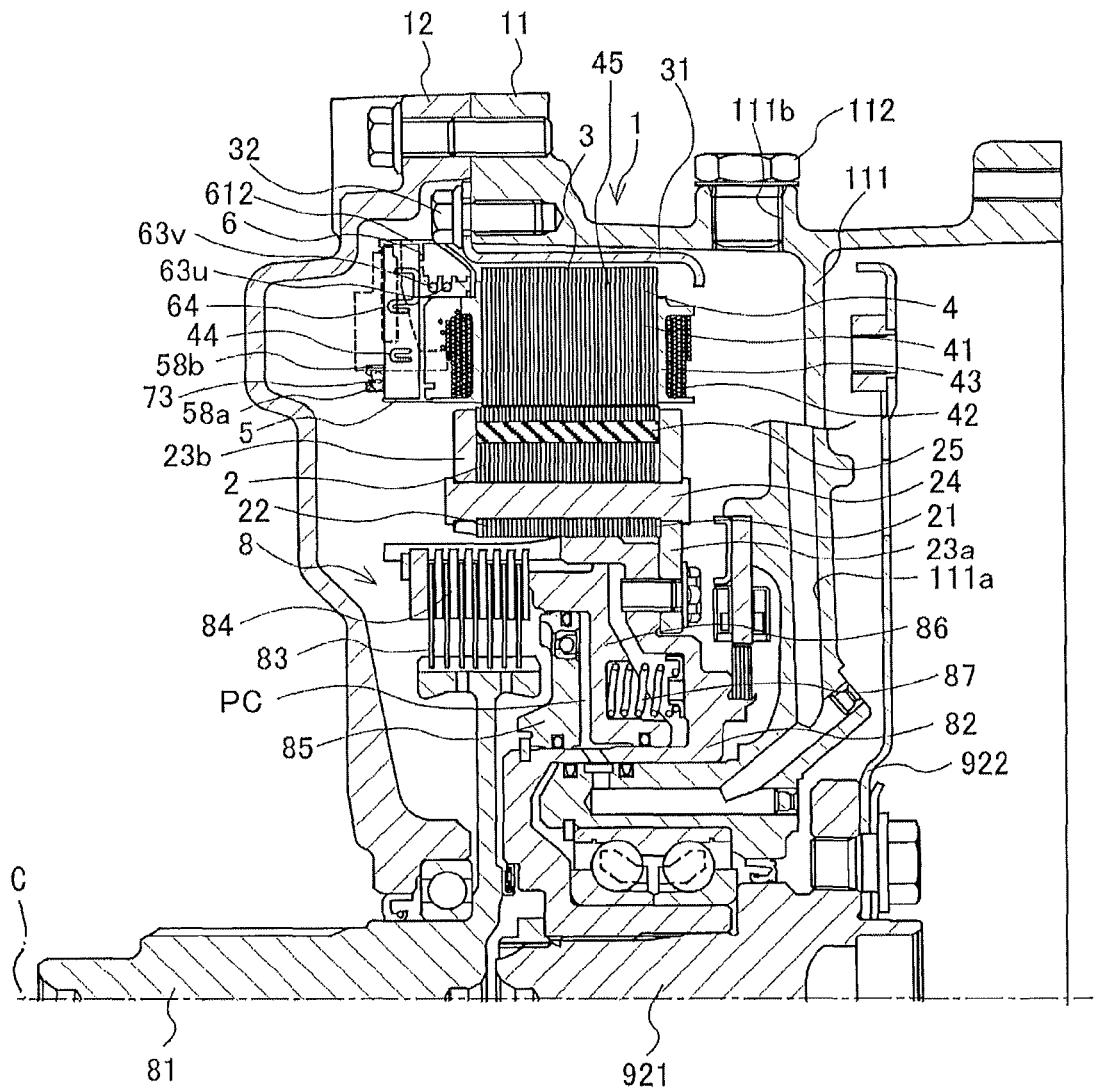
FIG. 2 is a cross-sectional view illustrating a state in which the electric motor shown in FIG. 1 is mounted on the vehicle.

In this description, unless particularly mentioned, a rotation axis direction or an axis direction means a direction along a rotation axis C of the electric motor 1 and the clutch device 8, that is, left and right directions in FIG. 2. Further, in FIG. 2, the left side represents the front side of the electric motor 1 and the clutch device 8, and the right side represents the rear side of them.

FIG. 1 shows a power train of a hybrid vehicle using the electric motor 1. In FIG. 1, thick lines represent mechanical connections of the vehicle and thin lines represent hydraulic pipes connecting devices. Further, dashed-dotted line arrows represent power supply lines, and broken-line arrows represent control signal lines.

In FIG. 1, a directional valve 16, a hydraulic pump 17, a reservoir unit 18, and a relief valve 19 are shown separately from the electric motor 1; however, actually, the directional valve 16, the hydraulic pump 17, and the relief valve 19 are integrated with the electric motor 1 together with the clutch device 8, and the reservoir unit 18 is formed in a motor housing 11. The electric motor 1, the clutch device 8, the directional valve 16, the hydraulic pump 17, and the relief valve 19 form a front module MD.

As shown in FIG. 1, the engine 91 of the vehicle and a rotor 2 (to be described below) of the electric motor 1 are connected in series through the clutch device 8 which is a multi-plate wet clutch. Further, the electric motor 1 for driving the hybrid vehicle is connected in series with the transmission 92 of the vehicle, and the transmission 92 is connected to a right drive wheel 94R and a left drive wheel 94L of the vehicle through a differential device 93. Hereinafter, the right drive wheel 94R and the left drive wheel 94L are generally referred to as drive wheels 94R and 94L.

The engine 91 is a general internal-combustion engine which generates power by a hydrocarbon-based fuel. The electric motor 1 is a synchronous motor for driving wheels of a vehicle; the electric motor 1 is not limited thereto. Further, the transmission 92 is a general automatic transmission. Furthermore, the clutch device 8 is a normally closed type clutch device which is normally connected between the engine 91 and the electric motor 1, and controls torque transmission between the engine 91 and the electric motor 1.

The directional valve 16 is provided between a pressure chamber PC of the clutch device 8 (to be described below) and the hydraulic pump 17. As shown in FIG. 1, the directional valve 16 is a 2-position electromagnetic valve having three ports, and one of the ports is connected to the pressure chamber PC of the clutch device 8 by an oil path 111a to be described below. Further, another port is connected to an outlet of the hydraulic pump 17, and the other port is connected to the reservoir unit 18 in the electric motor 1. An inlet of the hydraulic pump 17 is connected to the reservoir unit 18.

When the directional valve 16 is at an operation position P1 shown in FIG. 1, the outlet of the hydraulic pump 17 is connected to the pressure chamber PC, and the connection of the reservoir unit 18 with the outlet of the hydraulic pump 17 and the pressure chamber PC is disconnected. At this time, the hydraulic pump 17 suctions oil in the reservoir unit 18, and discharges the oil to the pressure chamber PC through the directional valve 16, such that the connection of the clutch device 8 is released.

When the directional valve 16 is at a non-operation position P2, the pressure chamber PC and the reservoir unit 18 are connected such that the oil (hydraulic pressure) in the pressure chamber PC is fed back to the reservoir unit 18. Accordingly, the clutch device 8 is connected. Further, when the directional valve 16 is at the non-operation position P2, the outlet of the hydraulic pump 17 is not connected with the pressure chamber PC and the reservoir unit 18, and the hydraulic pump 17 is stopped.

The relief valve 19 is a 2-position mechanical valve having two ports, is disposed between the outlet of the hydraulic pump 17 and the reservoir unit 18, and normally, connection of the outlet of the hydraulic pump 17 with the reservoir unit 18 and the inlet of the hydraulic pump 17 is disconnected (a state shown in FIG. 1). When the directional valve 16 is at the operation position P1, if the hydraulic pressure between the outlet of the hydraulic pump 17 and the pressure chamber PC increases up to a predetermined value or more, the relief valve 19 is switched, such that the outlet and inlet of the hydraulic pump 17 are connected so as to circulate the oil discharged from the hydraulic pump 17. Therefore, it is possible to prevent the hydraulic pressure from further increasing.

The stator 3 (to be described below) of the electric motor 1 is connected to a vehicle battery 96 through an inverter 95. The power of the vehicle battery 96 is converted into a three-phase AC by the inverter 95, and then is supplied to the stator 3, such that the rotor 2 of the electric motor 1 is driven. The power generated by the electric motor 1 is stored in the vehicle battery 96 through the inverter 95.

An engine ECU 97 is connected to the engine 91, and a hybrid ECU 98 (to be described below), and the number of rotation of the engine 91 is controlled based on an engine output signal from the hybrid ECU 98.

The hybrid ECU 98 is electrically connected to the above-mentioned directional valve 16 and hydraulic pump 17, and controls an operation of each of them.

Further, the hybrid ECU 98 is connected to the inverter 95, and transmits a driving signal to the inverter 95 based on a detection signal by an acceleration start sensor, a shift position switch, a vehicle speed sensor, or the like (not shown), so as to control a driving torque of the electric motor 1. As described above, the hybrid ECU 98 transmits the engine output signal to the engine ECU 97 so as to control the number of rotation of the engine 91. Further, the hybrid ECU 98 is electrically connected to the vehicle battery 96, and appropriately operates the electric motor 1 as an electric generator based on a charged state of the vehicle battery 96.

The vehicle using the power train shown in FIG. 1 releases the connection of the clutch device 8 when starting movement, and rotates the drive wheels 94R and 94L through the transmission 92 mainly by the electric motor 1.

When it is required to accelerate the vehicle during running, the vehicle connects the clutch device 8 and runs by the driving force of not only the electric motor 1 but also the engine 91.

When the vehicle is braked, the connection of the clutch device 8 is released and regenerative braking is performed. Further, the electric motor 1 is driven by the engine 91 through the clutch device 8, and also acts as an electric generator.

As shown in FIG. 2, the motor housing 11 (an example of a housing) is integrally formed by an aluminum alloy or the like. The rotor 2 and the stator 3 of the electric motor 1 are accommodated in the motor housing 11, and then the front side is sealed by a motor cover 12. On the front side of the motor cover 12, the engine 91 is installed, and on the rear side of the motor cover 12, the transmission 92 is disposed.

A fly-wheel of the engine 91 is connected to an input shaft 81 of the clutch device 8 through a damper (both of the fly-wheel and the damper are not shown). The input shaft 81 is supported by the motor cover 12 to be rotatable, and is formed such that the driving force of the engine 91 can be input to the input shaft 81.

On a fixed wall 111 of the motor housing 11, a drum member 82 of the clutch device 8 is supported to be rotatable. The drum member 82 is connected to the rotor 2 and extends inward in the radial direction, and the inner end of the drum member 82 is connected with a turbine shaft 921 of the transmission 92 by spline-fitting. At an end portion of the turbine shaft 921 in the shaft direction, a connection member 922 connected to a pump impeller is attached to be rotatable integrally with the turbine shaft 921. Therefore, the driving force of the rotor 2 can be input to a torque converter of the transmission 92 through the drum member 82.

Between the input shaft 81 and the drum member 82, a plurality of driving disks 83 and a plurality of driven plates 84 are interposed alternately in the rotation axis direction. The driving disks 83 and the driven plates 84 are disposed to be movable in the rotation axis direction. The driving disks 83 are formed to be rotatable integrally with the input shaft 81, and the driven plates 84 are formed to be rotatable integrally with the drum member 82. A fixed member 85 is fixed to the drum member 82. Between the drum member 82 and the fixed member 85, a plunger member 86 is provided to be movable in the rotation axis direction, and between the plunger member 86 and the fixed member 85, the pressure chamber PC is formed, which is liquid-tightly isolated.

Between the plunger member 86 and the drum member 82, a piston spring 87 is interposed, and the piston spring 87 biases the plunger member 86 toward the pressure chamber PC. The plunger member 86 receiving the biasing force from the piston spring 87 applies a pressure to the driving disks 83 and the driven plates 84 stacked between the plunger member 86 and the drum member 82 so as to fix the driving disks 83 and the driven plates 84. Therefore, the clutch device 8 becomes a connected state, such that the driving force input to the input shaft 81 is transmitted to the transmission 92.

At the fixed wall 111, the oil path 111a is formed to extend inward in the radial direction, and the oil path 111a is connected to the pressure chamber PC. After the above-mentioned directional valve 16 is switched to the operation position P1, the hydraulic pump 17 suctions the oil stored in the reservoir unit 18 in the motor housing 11 and discharges the oil, so as to supply the hydraulic pressure to the oil path 111a. The hydraulic pressure supplied to the oil path 111a is induced to the pressure chamber PC, such that the plunger member 86 moves toward the rear side against the biasing force of the piston spring 87. Therefore, the fixing of the driving disks 83 and the driven plates 84 by the pressure is released, such that the clutch device 8 becomes a disconnected state. As a result, the connection among the engine 91, the rotor 2, and the transmission 92 is disconnected.

The oil stored in the reservoir unit 18 is supplied for the connection and disconnection operation of the clutch device 8. Also, the oil is discharged by the hydraulic pump 17 or brushed up by the rotation of the rotor 31 so as to be used as a lubricating oil or a cooling oil for each portion of the electric motor 1 or the connected portion of the clutch device 8.

As shown in FIG. 2, an oil supply opening 111b passes through an upper end portion of the motor housing 11, and the oil is supplied from the oil supply opening 111b into the motor housing 11. A sealing plug 112 is screwed into the oil supply opening 111b, such that the inside of the motor housing 11 is insulated from the outside.

At the inner circumferential portion of the motor housing 11, the stator 3 of the electric motor 1 is mounted by screws 32. The stator 3 will be described below in detail.

On the inner side of the stator 3 in the radial direction, the rotor 2 of the electric motor 1 is disposed. The rotor 2 is provided to oppose the stator 3 with a predetermined gap therebetween. The rotor 2 includes a core body 21 formed by stacking a plurality of lamination steel plates 22 in the direction of the rotation axis C. A fastening pin 24 passes through the core body 21 and a pair of plate-shaped end plates 23a and 23b with both end surfaces of the core body 21 in the stacked direction interposed between the end plates 23a and 23b, and the end portions of the fastening pin 24 are caulked to be held. On the circumference of the rotor 2, a plurality of magnets 25 for field poles are provided.

Figure 6:
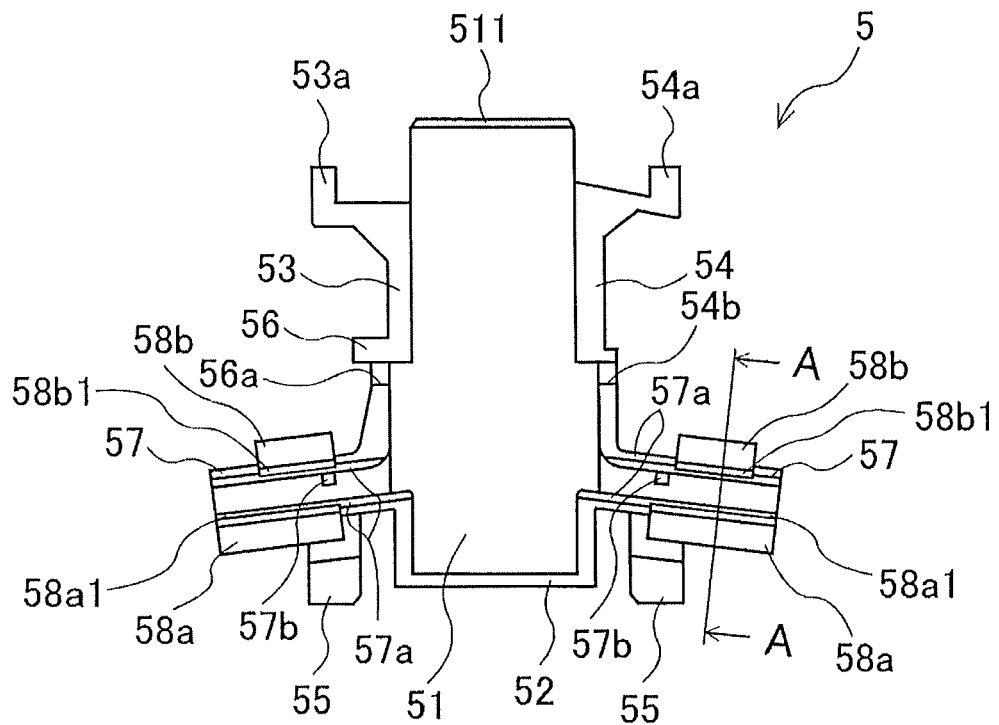
FIG. 6 is a plan view of the resin box.
Figure 7:
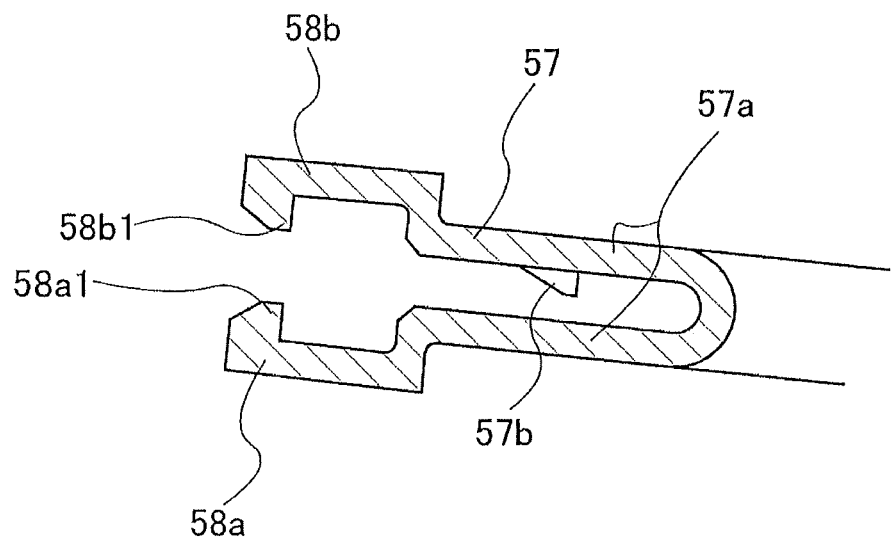
FIG. 7 is a cross-sectional view taken along a line A-A of FIG. 6.
Figure 8:
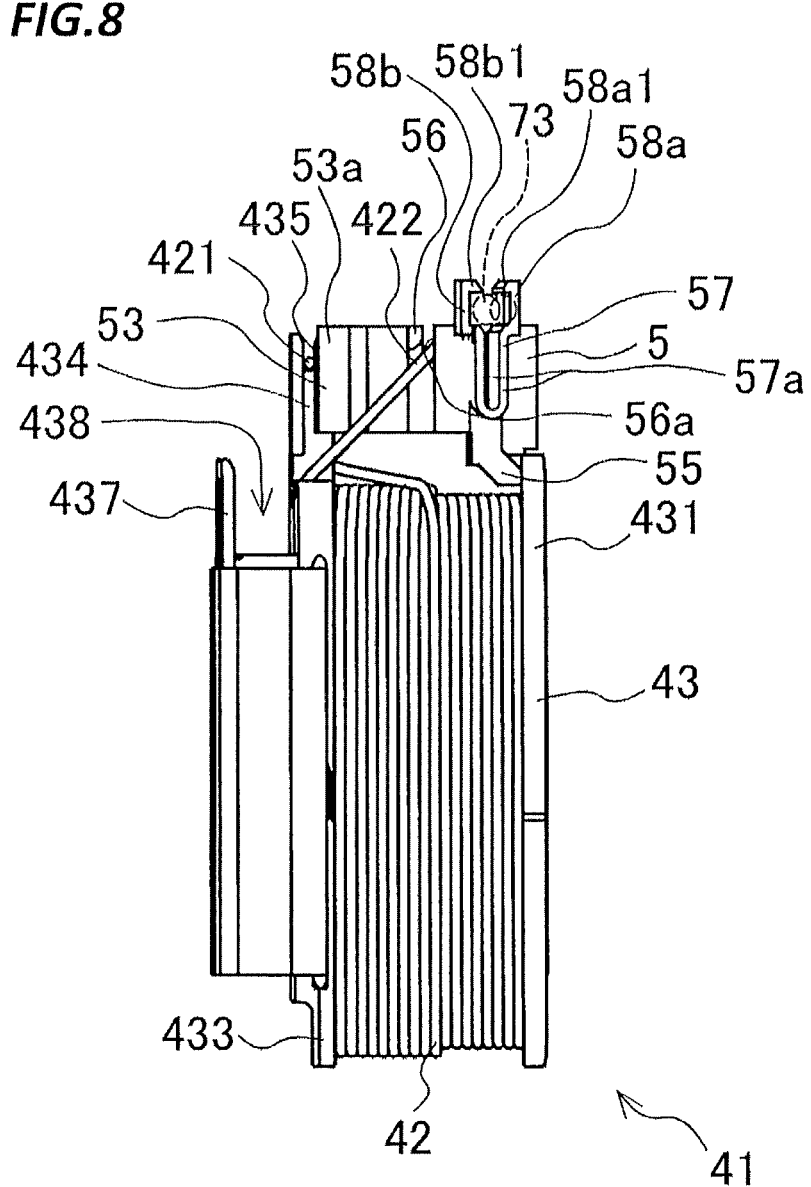
FIG. 8 is a side view illustrating the division core as seen in a circumferential direction.
Figure 10:
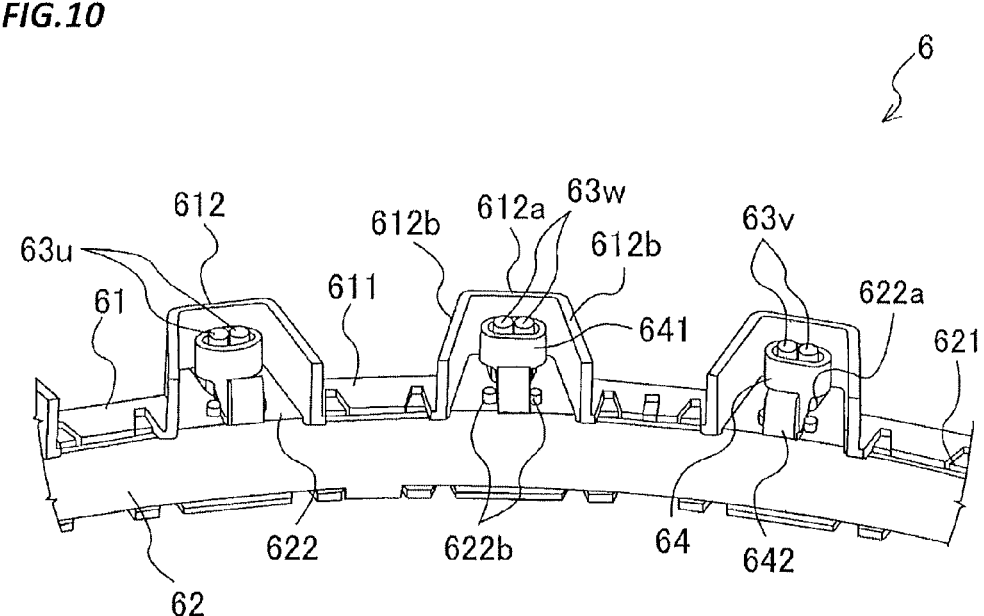
FIG. 10 is a partially enlarged perspective view of the bus ring shown in FIG. 9 as seen from the inner side in a radial direction.

Hereinafter, the stator 3 according to the first embodiment will be described. In the description, the upper side and the lower side of FIG. 8 are referred to as the upper side and the lower side of division cores 41 and a resin box 5; however, these directions have no relation with the directions on the actual stator 3. Further, in the description, the lower side of FIG. 6 is referred to as the rear side of the resin box 5, and the upper side of FIG. 6 is referred to as the front side of the resin box 5; however, these directions have no relation with the directions on the actual stator 3. Furthermore, in the description, the upper side and the lower side of FIG. 10 are referred to as the upper side and the lower side of a bus ring 6; however, these directions have no relation with the directions on the actual stator 3.

Figure 3:
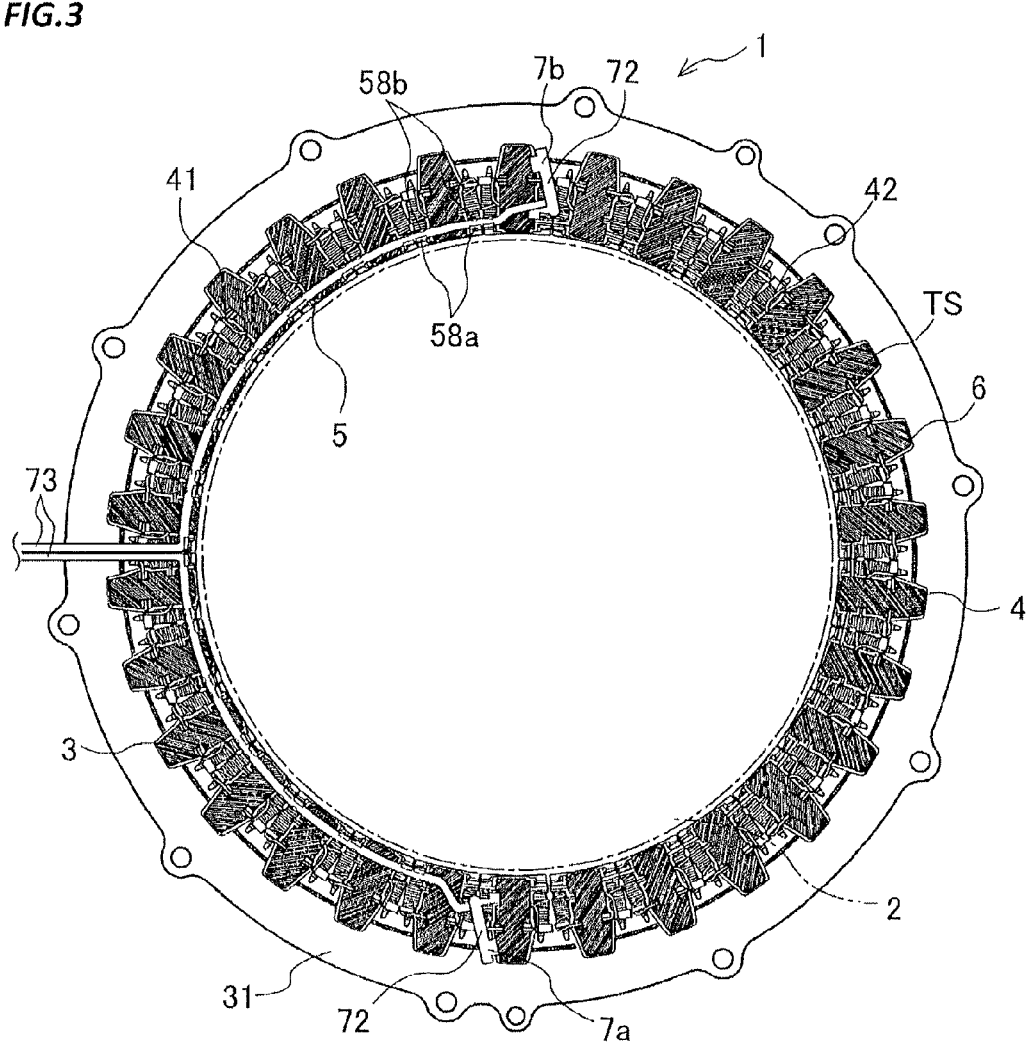
FIG. 3 is a plan view illustrating a stator of the electric motor shown in FIG. 2.

FIG. 3 shows the stator 3 as seen from the front side of the vehicle, and the upper side of FIG. 3 approximately corresponds to the upper side of the vehicle. On the inner circumferential surface of a stator ring 31, a plurality of (30 in the first embodiment) division cores 41 is held (arranged) at regular intervals by press-fitting or bonding. The division cores 41, each of which is wound with a coil 42, are successively and annularly arranged in the stator ring 31, so as to form a core unit 4. A plurality of accommodating spaces TS are formed by the core unit 4 and the bus ring 6, and each of the accommodating spaces TS is filled with an insulating resin material.

As shown in FIG. 3, at a lower end of the stator 3 formed annularly, an oil temperature sensor 7a is attached for detecting a temperature of the oil stored in the reservoir unit 18 which is at a lower portion of the motor housing 11. The oil temperature sensor 7a is connected to a sensor wire 73 (an example of a signal line together with a sensor wire 73 of a coil temperature sensor 7b to be described below) for transmitting a detection signal to the outside of the electric motor 1. The sensor wire 73 is drawn around on the stator 3, and then is led to the outside. The sensor wire 73 includes a metal conductive wire for transmitting a signal, and a protection tube made of a synthetic resin material, a synthetic rubber material, or the like to cover the conductive wire.

Further, at the upper end of the stator 3, the coil temperature sensor 7b is attached for detecting a temperature of the coil 42 of the coil unit 4. In the first embodiment, the coil temperature sensor 7b is at a position rotated 180 degrees from the oil temperature sensor 7a along the circumference of the stator 3;

however, this configuration is not limited thereto. The coil temperature sensor 7b is connected to the sensor wire 73 for transmitting a detection signal to the outside of the electric motor 1, similarly to the oil temperature sensor 7a. The sensor wire 73 is drawn around on the stator 3, and then is led from the same position as that of the sensor wire 73 of the oil temperature sensor 7a, to the outside.

Figure 4:
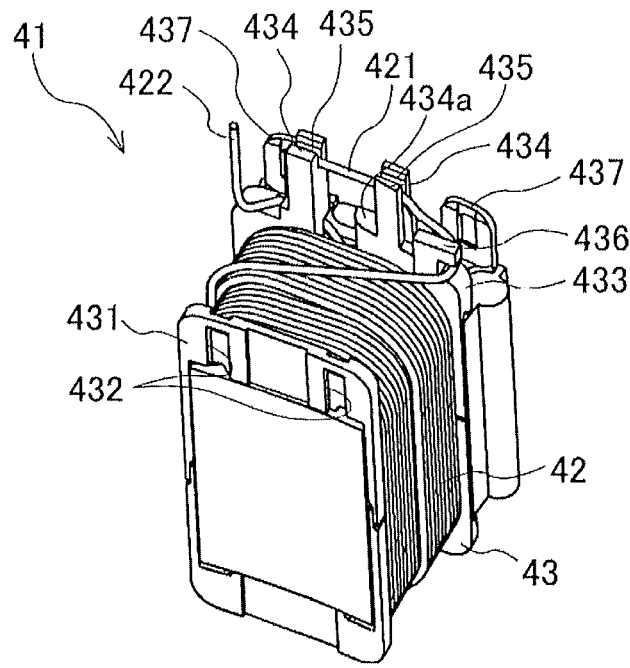
FIG. 4 is a perspective view of a division core in a state in which a resin box is removed.

FIG. 4 shows a state in which the resin box 5 (to be described below) is removed from a division core 41. The division core 41 includes a bobbin 43 including lamination steel plates 45 (shown in FIG. 2) therein. The bobbin 43 is made of a synthetic resin material, and the lamination steel plates 45 inside the bobbin 43 are insulated. A portion of the bobbin 43 positioned at the inner circumferential end when the division core 41 is held in the stator ring 31 is formed with a first flange 431 which protrudes in upper, lower, left and right directions.

At an upper portion of the first flange 431, a pair of locking holes 432 is formed. The locking holes 432 pass through the first flange 431, and are formed to be spaced apart from each other by a predetermined distance in a circumferential direction when the division core 41 is held by the stator ring 31 (hereinafter, a direction same as the circumferential direction is referred to as the circumferential direction).

Further, a second flange 433 is formed on the outer side in the radial direction to protrude in upper, lower, left and right directions and oppose the first flange 431 when the division core 41 is held by the stator ring 31. At an upper end portion of the second flange 433, a pair of wire locking portions 434 is provided at positions spaced apart from each other in the circumferential direction by a predetermined distance, to extend upward, and between the wire locking portions 434, a planar portion 434a is formed. At an upper end portion of each of the wire locking portions 434, a holding slit 435 is formed to extend in the circumferential direction.

Further, at the upper end of the second flange 433, a hook portion 436 is formed on a side of one wire locking portion 434. The hook portion 436 has an approximately L shape opened outward in the circumferential direction of the division core 41.

Further, a portion of the bobbin 43 positioned at the outer circumferential end when the division core 41 is held by the stator ring 31 is formed with a pair of retainers 437 which protrudes upward (in a direction corresponding to a central axis direction of the core unit 4). The retainers 437 are provided at positions spaced apart from each other in the circumferential direction by a predetermined distance, and oppose the resin box 5 (to be described below) in the radial direction of the stator 3 (hereinafter, a direction same as the radial direction of the stator 3 is referred to as the radial direction). In the radial direction of the stator 3, between the retainers 437 and the second flange 433, a bus-ring inserting portion 438 is formed (see FIG. 8).

Between the first flange 431 and the second flange 433, the coil 42 such as an enamel wire is wound. A high-voltage-side end portion 421 of the wound coil 42 (an example of an end portion of a coil) is engaged with the hook portion 436, is turned around, and then is inserted into the holding slits 435 of the two wire locking portions 434, so as to be hung between the wire locking portions 434 (see FIG. 4).

Figure 5:
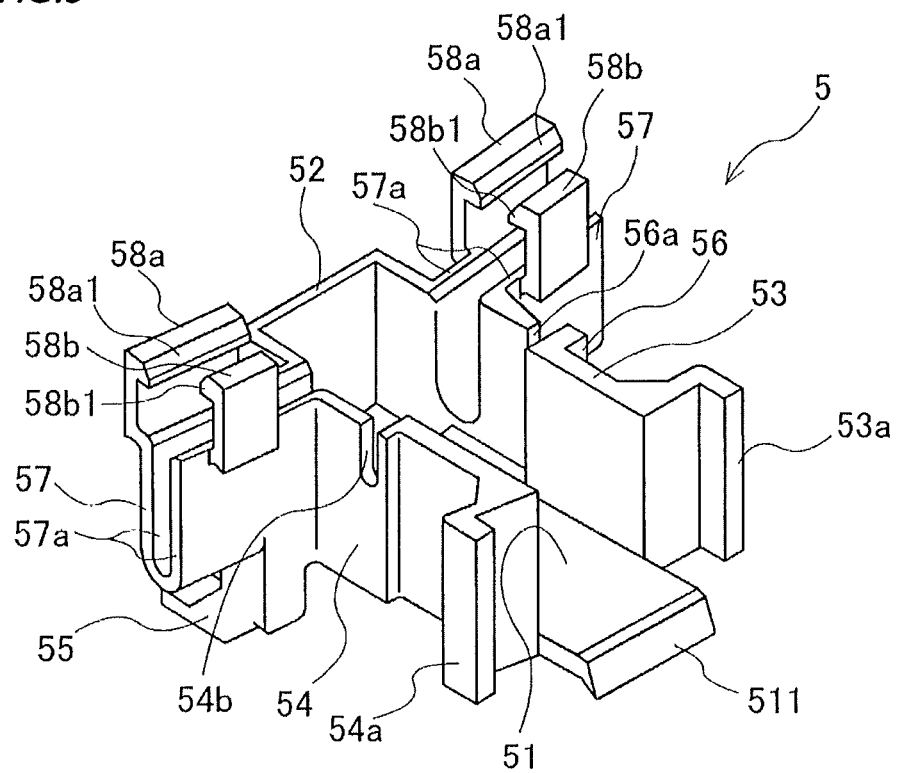
FIG. 5 is a perspective view of the resin box.

As shown in FIGS. 5 and 6, the resin box 5 is integrally made of aromatic nylon or a polyphenylene sulfide resin and has a predetermined volume and an approximate container shape; however, the resin box 5 is not limited thereto. A configuration including the resin box 5 and a surrounding portion 612 of the bus ring 6 is an example of an accommodating portion.

The resin box 5 has a rear wall 52 on a rear end of a bottom plate portion 51, and a pair of side plates 53 and 54 standing from side end portions of the bottom plate portion 51. A front edge portion of the bottom plate portion 51 hangs down so as to form an insertion portion 511. An upper side and front side (the side on which the bus ring 6 (to be described below) is positioned on the stator 3) of the resin box 5 are opened such that the resin box 5 has an approximate U shape as seen in plan view. The resin box 5 is provided on each bobbin 43 to be attachable and detachable.

At the front end portions of the side plates 53 and 54, stepped portions 53a and 54a are formed to expand the width between the side plates 53 and 54. Further, at the rear end portions of the side plates 53 and 54, holder engagement portions 55 protrude downward.

Furthermore, at the side plate 54, a holding groove 54b is formed to be opened upward. Meanwhile, a portion of the side plate 53 is cut open, so as to form a folded portion 56. In this way, a wire slit 56a is formed adjacent to the folded portion 56, to have an opened upper end.

Further, from the rear side portions of the side plates 53 and 54, terminal mounting portions 57 extend outward in the circumferential direction. Each of the terminal mounting portions 57 is formed by a pair of pinching walls 57a extending in parallel to each other and having lower ends connected to each other, so as to have an approximately U-shaped section. Between the pinching walls 57a opposing each other, a gap is formed to pass through the side plates 53 and 54 such that a neutral terminal (to be described below) can be inserted. In each of the terminal mounting portions 57, a pulling-out preventive protrusion 57b for holding a neutral terminal 44 protrudes from one side pinching wall 57a (see FIG. 6).

Further, from the upper end portions (end portions in the rotation axis direction) of the terminal mounting portions 57, a pair of snap pieces 58a and 58b (an example of a holding portion) protrude upward. The snap pieces 58a and 58b oppose each other and have flexibility, and the snap piece 58a is formed to be longer in the circumferential direction than the snap piece 58b. At the upper end portions of the snap pieces 58a and 58b, jaw portions 58a1 and 58b1 are formed (see FIG. 7), so as to be capable of holding the sensor wire 73 as will be described below.

As show in FIG. 8, the resin box 5 is attached on each bobbin 43 wound with the coil 42 (to be positioned outward in the rotation axis direction with respect to the coil 42). If the resin box 5 is attached on the bobbin 43, the insertion portion 511 formed at the front edge of the bottom plate portion 51 is inserted into between the wire locking portions 434 so as to be mounted on the planar portion 434a, and the rear end portions of the holder engagement portions 55 are inserted in the locking holes 432 of the bobbin 43. Further, the stepped portions 53a and 54a of the side plates 53 and 54 are engaged with the wire locking portions 434 from the outer side in the circumferential direction, respectively, such that the resin box 5 is positioned in a horizontal plane with respect to the bobbin 43.

Next, a low-voltage-side end portion 422 (an example of an end portion of the coil) of the coil 42 is inserted into the wire slit 56a of the side plate 53, and then is engaged with the holding groove 54b of the side plate 54. Therefore, the low-voltage-side end portion 422 is provided to be hung between the side plates 53 and 54 (see FIG. 11).

Figure 11:
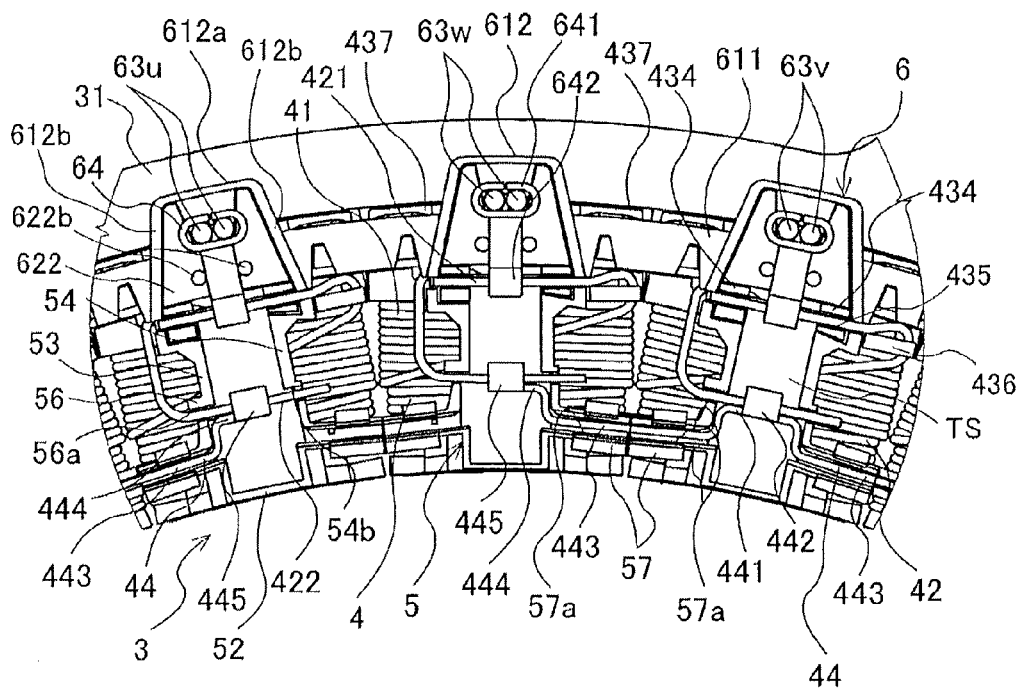
FIG. 11 is a partial plan view of a state in which the bus ring is attached to a core unit, as seen in a rotation axis direction.

All of the division cores 41 are attached on the inner circumferential surface of the stator ring 31 to be annularly arranged, and then the neutral terminals 44 are mounted on the resin box 5 (see FIG. 11).

The neutral terminal 44 is made of a conductive metal. The neutral terminal 44 has a symmetrical shape with respect to a central protrusion 441 positioned at the center in the longitudinal direction in plan view. The central protrusion 441 protrudes outward in the radial direction in a state where the resin box 5 is attached, and has a central connection piece 442 formed thereon. Further, both end portions of the central protrusion 441 are connected to linear insertion portions 443, and at each of the insertion portions 443, an end edge portion 444 is formed to protrude outward in the radial direction. At each end edge portion 444, an end-portion connection piece 445 is formed.

The neutral terminal 44 is mounted over three adjacent resin boxes 5 by inserting each of the insertion portions 443 into between the pinching walls 57a of each resin box 5 and holding each of the insertion portions 443 by the pulling-out preventive protrusions 57b. Therefore, the central connection piece 442 and a pair of end-portion connection pieces 445 are disposed in the resin boxes of three successive division cores 41. The central connection pieces 442 and the end-portion connection pieces 445 are fixed to the low-voltage-side end portion 422 of the coil 42 provided to be hung between the side plates 53 and 54, by fusing, caulking, welding, or the like, such that the low-voltage-side end portions 422 of adjacent coils 42 are connected to each other so as to form neutral points. All of the neutral terminals 44 are connected to a low-voltage-side of the inverter 95.

Figure 9:
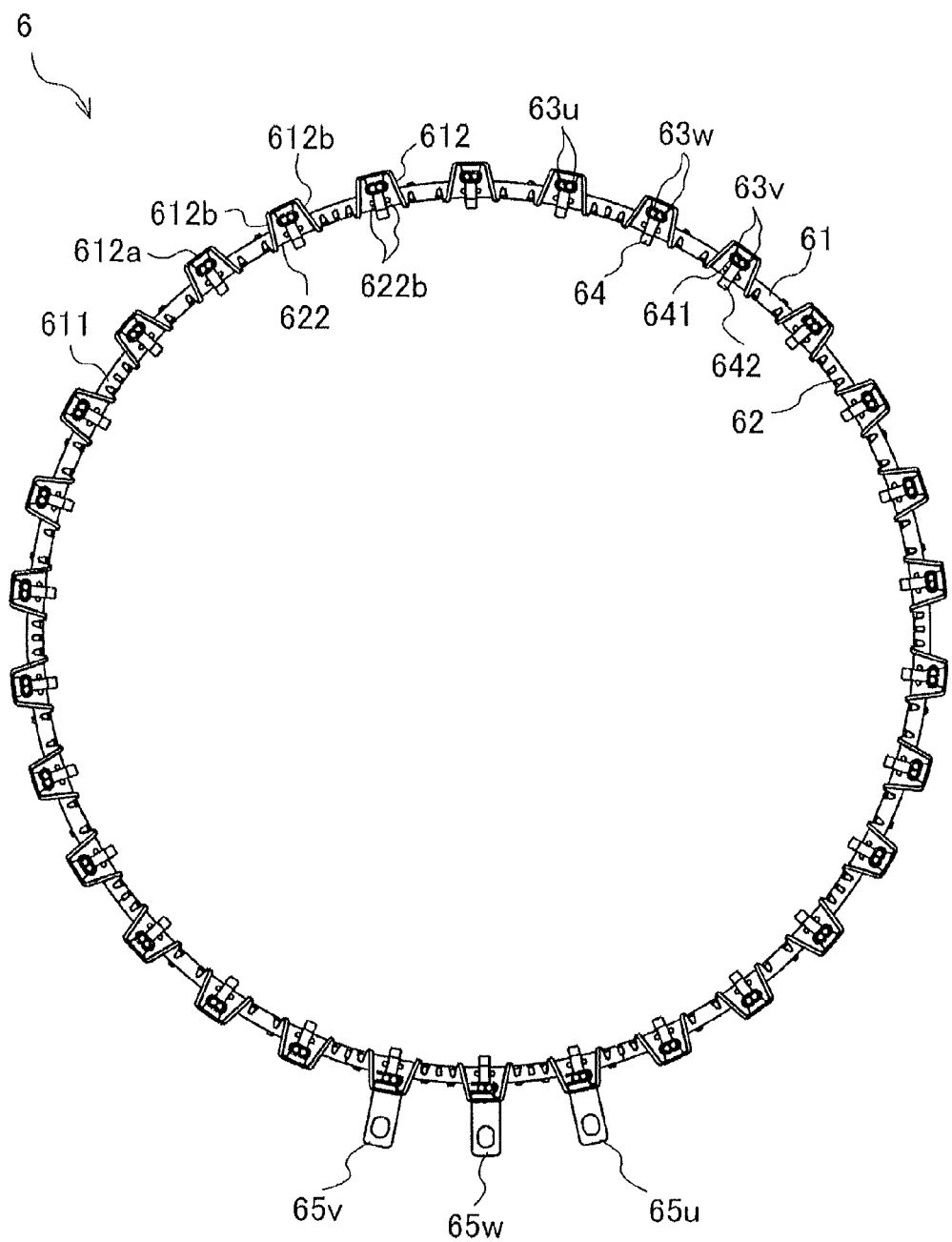
FIG. 9 is a plan view of a bus ring.

As shown in FIG. 9, the bus ring 6 is formed annularly to oppose the core unit 4 from the outer side in the radial direction. The bus ring 6 includes an outer clip 61 and an inner clip 62 annularly made of a synthetic resin material, and fitted with each other in the radial direction. Each of the outer clip 61 and the inner clip 62 may be formed by connecting a plurality of divided segments.

The outer clip 61 has external terminals 65u, 65v, and 65w extending at three positions to be connected to high-voltage-side phases of the inverter 95, respectively (see FIG. 9). The external terminals 65u, 65v, and 65w are connected to power supply terminals 64 having individual phases (to be described below) in the bus ring 6; however, the external terminals 65u, 65v, and 65w may be integrally formed with the power supply terminals 64.

A plurality of segment wires 63u, a plurality of segment wires 63v, and a plurality of segment wires 63w having individual phases (an example of a power supply line, together with the power supply terminals 64) are held in the bus ring 6. The segment wires 63u, 63v, and 63w are made of, for example, enamel wires in an arc shape. The segment wires 63u, 63v, and 63w having different phases are insulated from each other in the bus ring 6. Further, the bus ring 6 includes the power supply terminals 64 which are made of a conductive metal by caulking the segment wires 63u, 63v, and 63w (see FIG. 10).

Upwardly extending end portions of the segment wires 63u, 63v, and 63w having the same phase are connected by caulking the power supply terminals 64. The power supply terminals 64 include caulked portions 641 formed by caulking end portions of the segment wires 63u, 63v, and 63w, and coil engagement portions 642 extending from the caulked portions 641 inward in the radial direction of the bus ring 6. The front edges of the coil engagement portions 642 are formed to extend upward and then come down, so as to have an approximately inverted U shape (see FIG. 10).

From an upper surface 621 of the inner clip 62, a plurality of holding flanges 622 protrude outward in the radial direction on the circumference at regular intervals. On the holding flanges 622, trapezoidal notches 622a are formed to allow the end portions of the segment wires 63u, 63v, and 63w to be inserted. Further, on each of the holding flanges 622, a pair of holding protrusions 622b is formed. The coil engagement portions 642 of the power supply terminals 64 are fitted and held between the holding protrusions 622b.

From an upper surface of an annular portion 611 of the outer clip 61, a plurality of surrounding portions 612 protrude upward (see FIG. 10). The surrounding portions 612 are provided on the circumference of the outer clip 61 at regular intervals. Each of the surrounding portions 612 has a wall shape protruding outward in the radial direction of the bus ring 6, and includes a standing wall portion 612a positioned on the outer side, and a pair of side walls 612b extending from both edge portions of the standing wall portion 612a toward the inner side in the radial direction. The end portions of the side walls 612b are opened, such that the surrounding portion 612 is approximately U-shaped in plan view.

The outer clip 61 is fitted with the inner clip 62, such that the surrounding portions 612 surround the power supply terminals 64 formed by caulking the segment wires 63u, 63v, and 63w (see FIG. 11). The end portions of the segment wires 63u, 63v, and 63w having the same phase protrude in every three surrounding portions 612 on the circumference of the bus ring 6.

The bus ring 6 is attached to the core unit 4 held by the stator ring 31, such that the bus ring 6 opposes the core unit 4 from the upper side. The bus ring 6 is positioned such that the annular portion 611 of the outer clip 61 is disposed inside the bus-ring inserting portion 438 of each division core 41. Further, the outer circumferential surface of each surrounding portion 612 of the bus ring 6 is positioned between a pair of retainers 437 in the circumferential direction. In this case, the wire locking portions 434 of the division cores 41 are interposed between the side walls 612b of the surrounding portions 612, such that the wire locking portions 434 oppose the end portions of the opened side plates 53 and 54 of the resin boxes 5 from the outer side in the radial direction.

Therefore, on the division cores 41, the accommodating spaces TS having a predetermined volume (see FIG. 11) are independently formed for each division core 41 by the wire locking portion 434, the resin box 5, and the surrounding portion 612. In each accommodating space TS, the coil engagement portion 642 of the power supply terminal 64 is engaged with the high-voltage-side end portion 421 of the coil 42 hung between the wire locking portions 434, and is fixed by fusing, caulking, welding, or the like.

The connection portions of the high-voltage-side end portions 421 of the coils 42 and the power supply terminals 64, and the connection portions of the low-voltage-side end portions 422 and the neutral terminal 44 are accommodated in the accommodating spaces TS, and then the accommodating spaces TS are filled with an insulating resin material as a bonding material. When the insulating resin material is filled, even if there is a small gap between the resin boxes 5 and the surrounding portions 612, since the insulating resin material has predetermined viscosity, the insulating resin material does not flow out of the accommodating spaces TS. The filled insulating resin material hardens to fix the bobbins 43, the resin boxes 5, and the bus ring 6, thereby completing the stator 3.

In the electric motor 1 having the above-mentioned configuration, for example, a three-phase AC is supplied from the inverter 95 of the vehicle to the coils 42 having the individual phases through the external terminals 65u, 65v, and 65w. Therefore, a rotating magnetic field is generated in the stator 3, such that the rotor 2 rotates with respect to the stator 3 by an attractive force or a repulsive force originating from the rotating magnetic field. A further detailed configuration of the above-mentioned stator 3 is disclosed in JP-A-2010-233405, the entire content of which is incorporated herein by reference.

Figure 12:
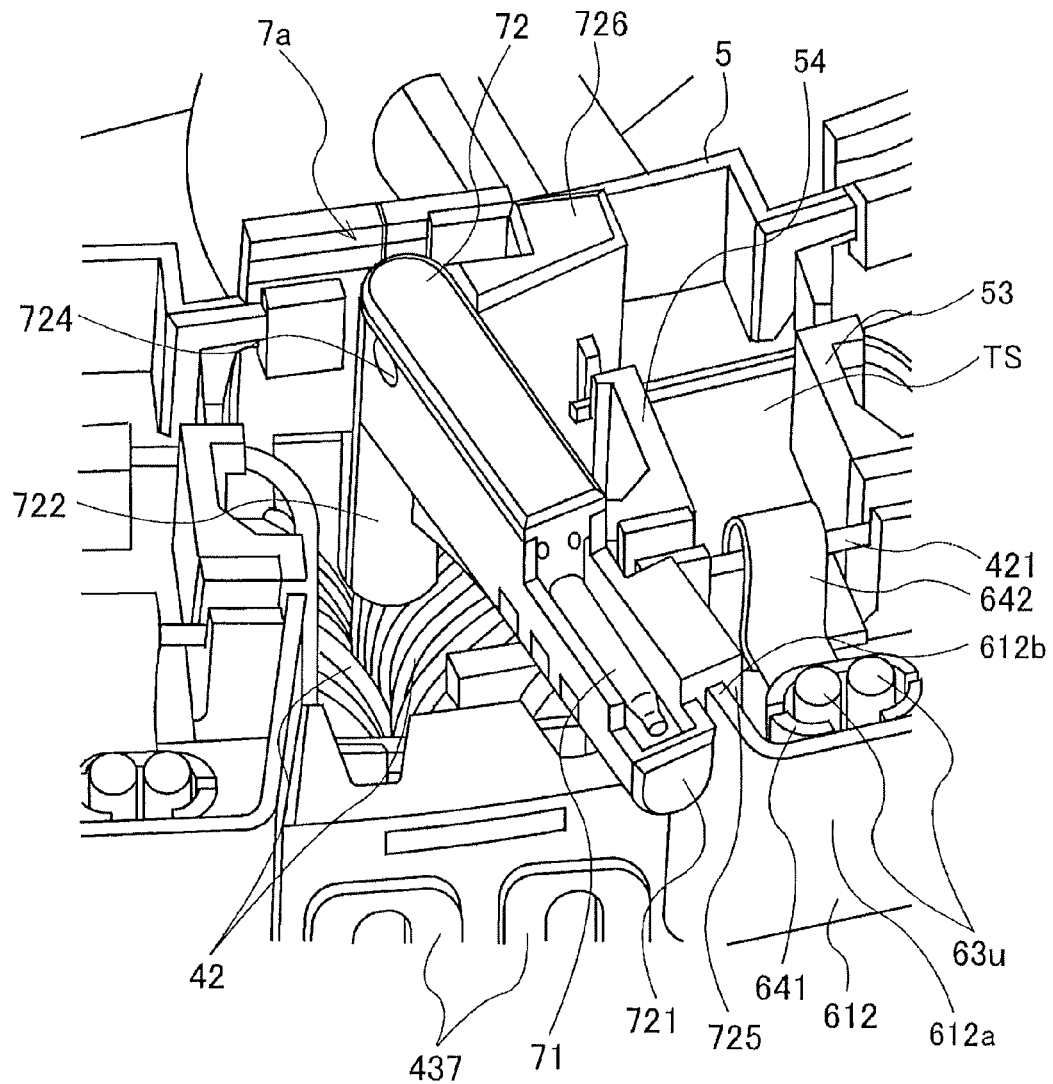
FIG. 12 is a perspective view illustrating a portion of a stator on which a holder bracket accommodating an oil temperature sensor is attached.
Figure 13:
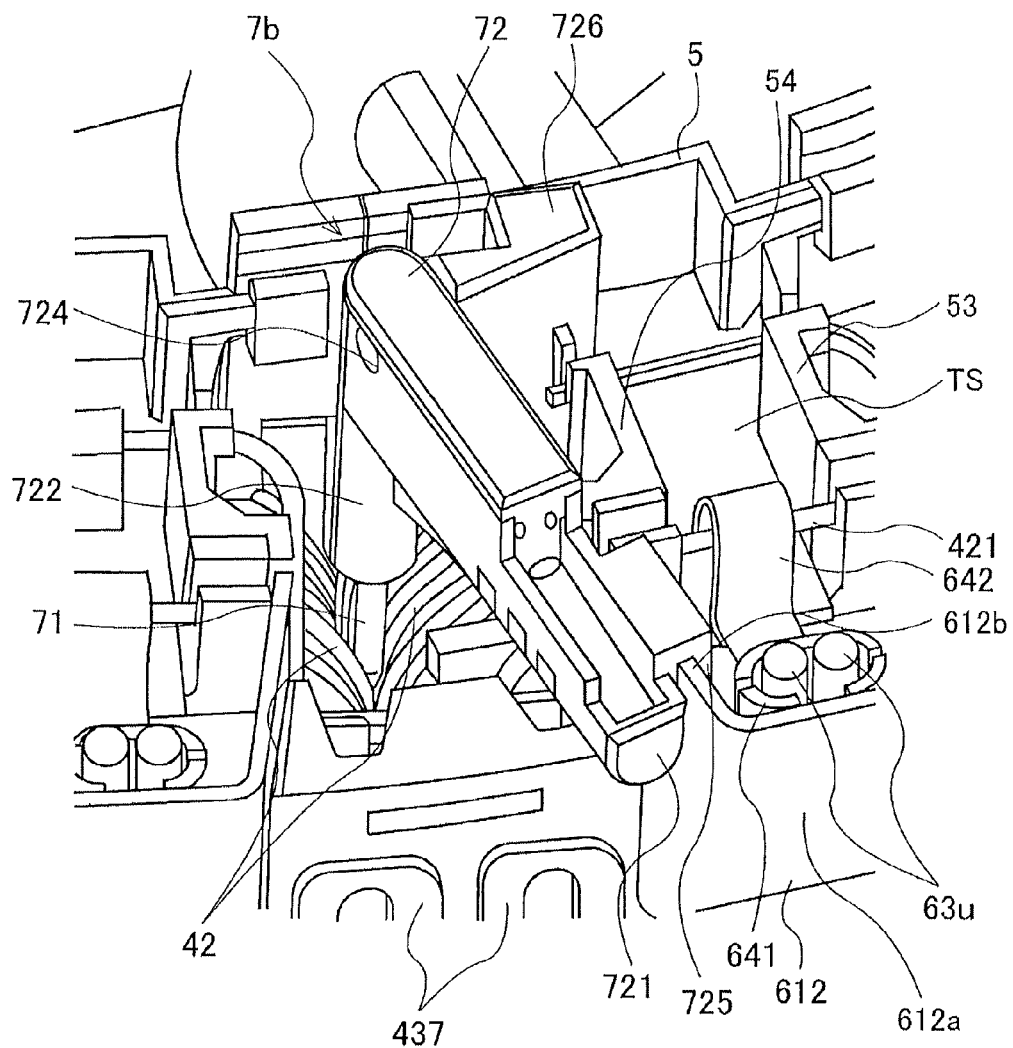
FIG. 13 is a perspective view illustrating a portion of the stator on which a holder bracket accommodating a coil temperature sensor is attached.

Next, the configurations of the above-mentioned oil temperature sensor 7a and coil temperature sensor 7b and a wiring method of the sensor wires 73 connected to them will be described in detail with reference to FIGS. 12 to 21. In FIGS. 12 and 13, the sensor wires 73 are not shown. As shown in FIG. 12, a thermistor element 71 (an example of a temperature detector) included in the oil temperature sensor 7a is accommodated in a holder bracket 72 to be directed downward, so as to be capable of detecting the temperature of the oil stored in the reservoir unit 18 (the lower portion of the motor housing 11).

Further, as shown in FIG. 13, a thermistor element 71 (an example of a temperature detector) included in the coil temperature sensor 7b is accommodated in a holder bracket 72 and is inserted between adjacent coils 42, so as to be capable of detecting the temperature of the coils 42 in the core unit 4. The thermistor element 71 included in the coil temperature sensor 7b and the holder bracket 72 are the same as those of the oil temperature sensor 7a.

Figure 14:
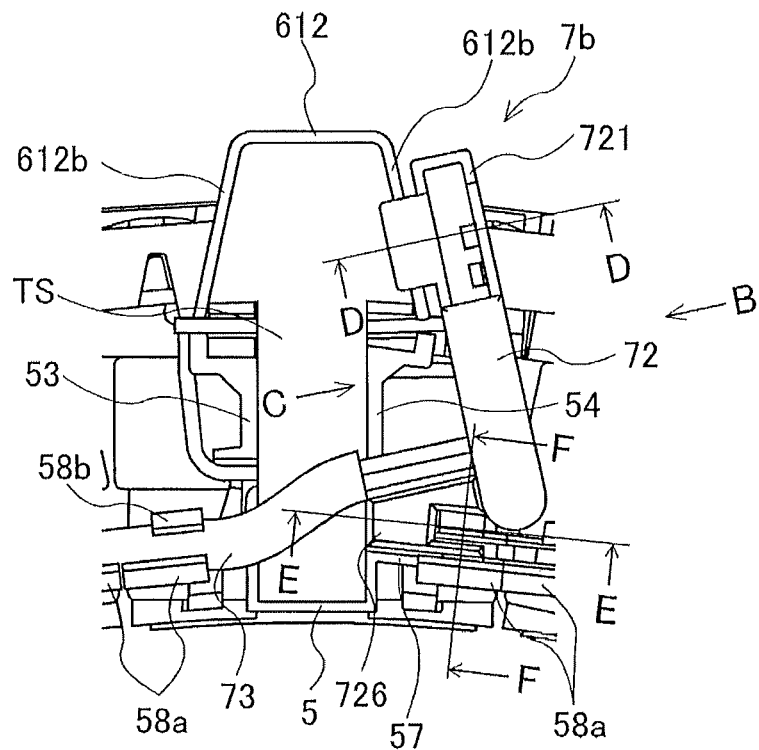
FIG. 14 is a partial plan view of the portion of the stator on which the holder bracket is attached, as seen in the rotation axis direction.

The holder bracket 72 (an example of a bracket) is integrally made of a synthetic resin material to be capable of being used for both of the oil temperature sensor 7a and the coil temperature sensor 7b. Regardless of whether the holder bracket 72 is used for the oil temperature sensor 7a or the coil temperature sensor 7b, the holder bracket 72 accommodating the thermistor element 71 is attached to one of the plurality of resin boxes 5 and a surrounding portion 612 of the bus ring 6 to be spaced apart from the coils 42 by a predetermined distance. As shown in FIG. 14, from the holder bracket 72, the sensor wire 73 connected to the thermistor element 71 is drawn.

When the holder bracket 72 is attached to the core unit 4, the holder bracket 72 has a first accommodating portion 721 extending outward in the radial direction and a second accommodating portion 722 extending in the rotation axis direction. When the holder bracket 72 is used for the oil temperature sensor 7a, the first accommodating portion 721 accommodates the thermistor element 71, and when the holder bracket 72 is used for the coil temperature sensor 7b, the second accommodating portion 722 accommodates the thermistor element 71.

Figure 16:
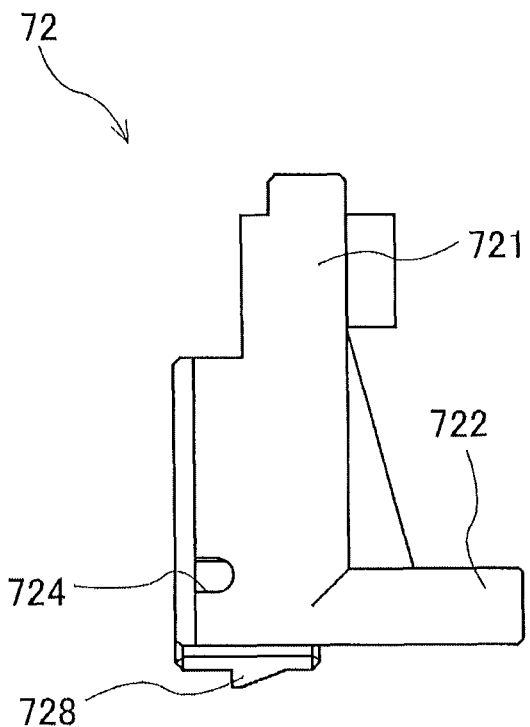
FIG. 16 is a view illustrating the holder bracket shown in FIG. 14, as seen along an arrow B.
Figure 17:
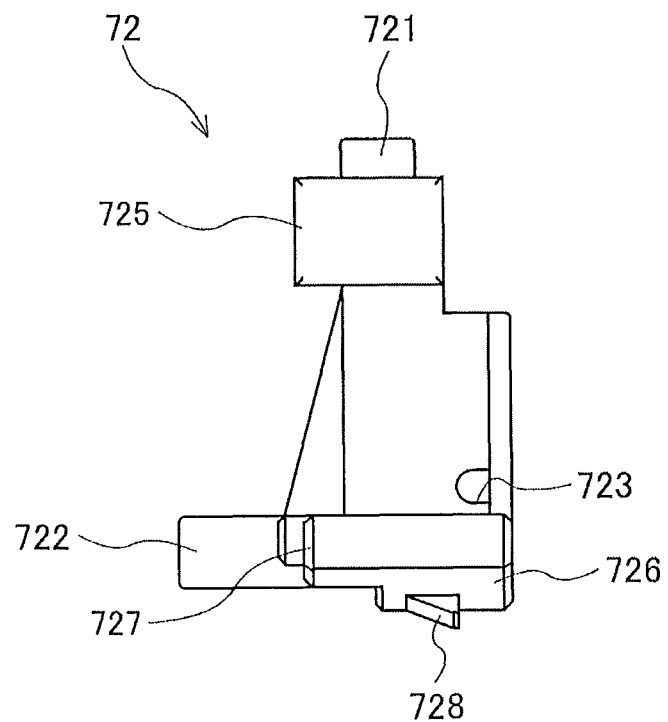
FIG. 17 is a view illustrating the holder bracket shown in FIG. 14, as seen along an arrow C.
Figure 18:
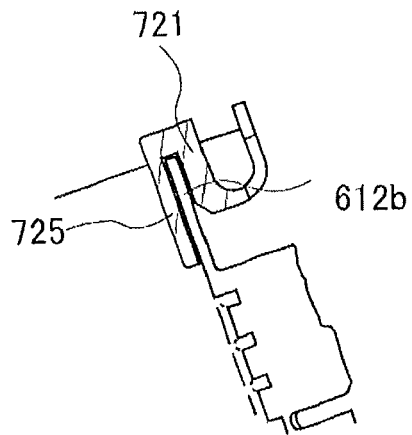
FIG. 18 is a cross-sectional view taken along a line D-D of FIG. 14.
Figure 19:
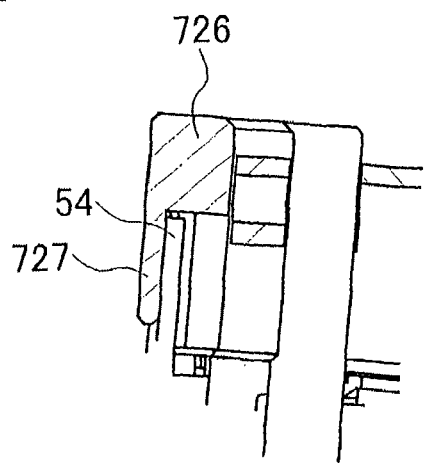
FIG. 19 is a cross-sectional view taken along a line E-E of FIG. 14.
Figure 20:
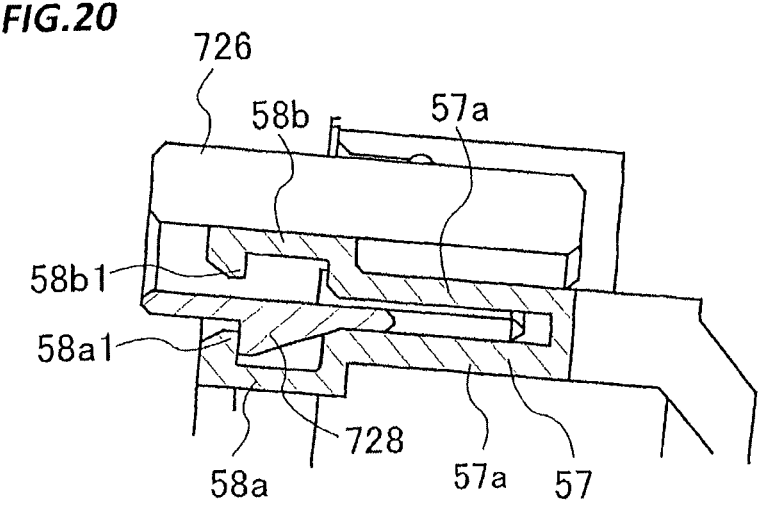
FIG. 20 is a cross-sectional view taken along a line F-F of FIG. 14.

Further, in both side surfaces of the first accommodating portion 721, a first cable hole 723 and a second cable hole 724 are formed to allow the sensor wire 73 to be drawn (FIGS. 17 and 16). The first cable hole 723 and the second cable hole 724 are distinguishingly used based on the portion accommodating the thermistor element 71 and a wiring direction of the thermistor element 71.

Figure 15:
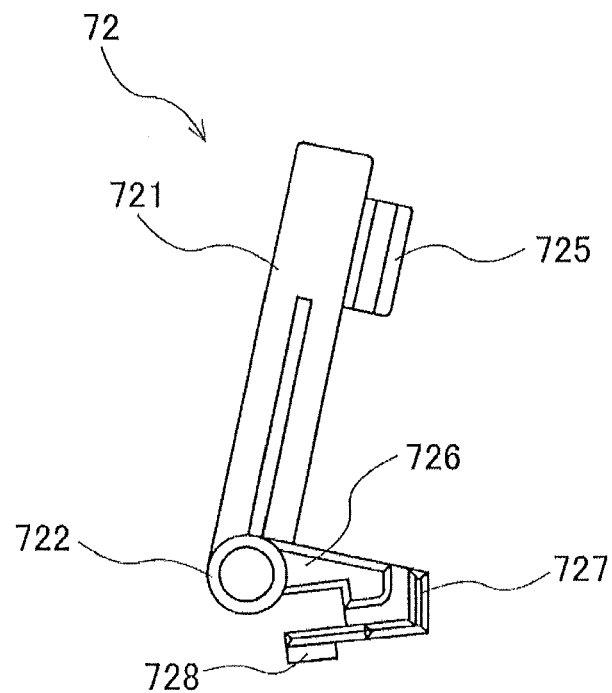
FIG. 15 is a view illustrating the holder bracket shown in FIG. 14, as seen from the lower side.

At a front edge portion of a side of the first accommodating portion 721 of the holder bracket 72, a first locking piece 725 is formed to protrude toward the coil 42 when the holder bracket 72 is attached to the core unit 4 (see FIG. 15).

Further, from the second accommodating portion 722 of the holder bracket 72, an attachment portion 726 extends. On a lower surface (surface positioned on the coil 42 side when the holder bracket 72 is attached to the core unit 4) of the attachment portion 726, a second locking piece 727 protrudes. Further, on a side surface of the attachment portion 726, a holding protrusion 728 is formed (see FIGS. 15 to 17).

When the holder bracket 72 accommodating the thermistor element 71 is attached to the core unit 4, the holder bracket 72 is brought close to the core unit 4, and is fitted with the resin box 5 and the surrounding portion 612 of the bus ring 6. At this time, the above-mentioned first locking piece 725 is engaged with the side walls 612b of the surrounding portion 612 (see FIG. 18). Further, the second locking piece 727 is engaged with the side plate 54 of the resin box 5 (see FIG. 19). Furthermore, the holding protrusion 728 is engaged with one snap piece 58a of the resin box 5.

When the holding protrusion 728 is engaged with the snap piece 58a, since the snap piece 58a runs onto the holding protrusion 728 and then the jaw portion 58a1 is engaged with the holding protrusion 728, the holder bracket 72 is prevented from being pulled (dropping) out of the resin box 5.

As shown in FIG. 3, when the sensor wire 73 connected to the thermistor element 71 is used for the oil temperature sensor 7a, the sensor wire 73 is drawn from the second cable hole 724 of the holder bracket 72 and is disposed on the core unit 4. When the sensor wire 73 is used for the coil temperature sensor 7b, the sensor wire 73 is drawn from the first cable hole 723 of the holder bracket 72, and is disposed on the core unit 4.

Figure 21:
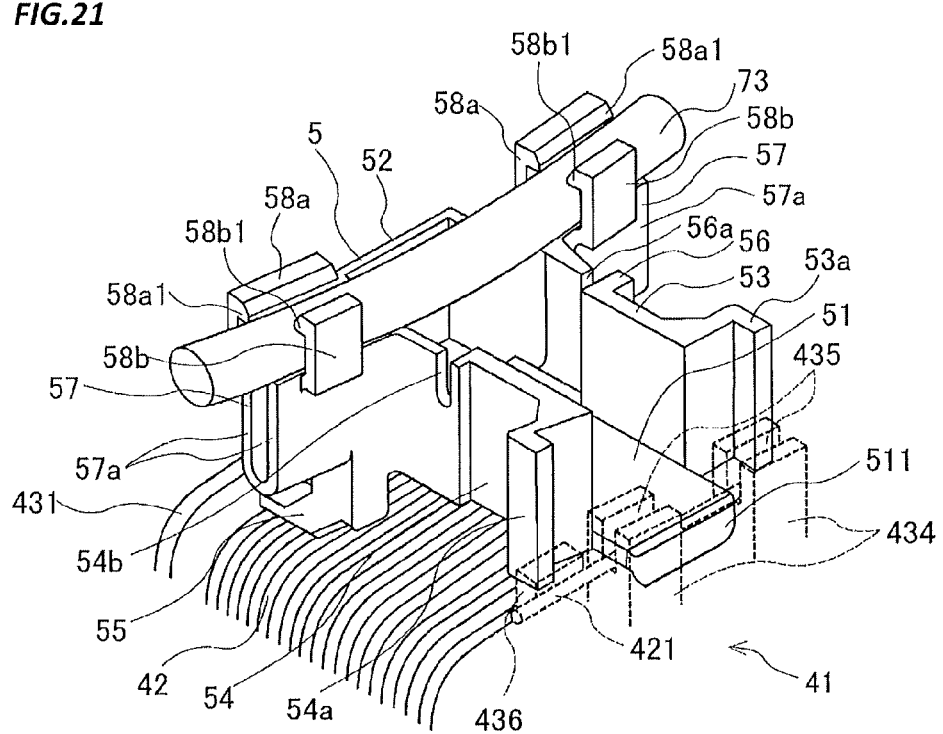
FIG. 21 is a perspective view illustrating a state in which a sensor wire is held by snap pieces of the resin box.

As shown in FIG. 21, in the first embodiment, the sensor wire 73 drawn from the holder bracket 72 is pinched by the snap pieces 58a and 58b of the resin boxes 5 until the sensor wire 73 leads to the outside of the stator 3. The sensor wire 73 is held at positions, spaced apart from each division core 41 in the rotation axis direction by a predetermined distance, by the snap pieces 58a and 58b, and is disposed in an approximately circumferential shape on the core unit 4 (see FIG. 3). The sensor wire 73 comes into between the snap pieces 58a and 58b while bending the snap pieces 58a and 58b, so as to be pinched in a radial direction by the snap pieces 58a and 58b. The sensor wire 73 pinched and held in the radial direction of the stator 3 by the snap pieces 58a and 58b is prevented from being pulled out by the jaw portions 58a1 and 58b1.

When the above-mentioned coil temperature sensor 7b detects an overheated state of the electric motor 1 or the oil temperature sensor 7a detects an overheated state of the coils in the motor housing 11, so that it is determined that the cooling capacity of the coil on the electric motor 1 is reduced, the hybrid ECU 98 controls the inverter 95 such that the electric motor 1 is decelerated or the operation of the electric motor 1 stops.

According to the first embodiment, the snap pieces 58a and 58b for holding the sensor wire 73 connected to the thermistor element 71 are formed in the resin boxes 5. Therefore, it is possible to easily hold the sensor wire 73 on the stator 3 and to reduce the cost of the stator 3.

Further, since the sensor wire 73 is held by the resin box 5, it is not required to add a new component for holding the sensor wire 73. Therefore, it is possible to reduce the cost of the stator 3.

Furthermore, the holding portions for the sensor wire 73 are made of the plurality of snap pieces 58a and 58b which pinch the sensor wire 73 in the radial direction. Therefore, it is possible to simply hold the sensor wire 73 only by inserting the sensor wire 73 into between the snap pieces 58a and 58b.

Further, since the snap pieces 58a and 58b are provided at the end portions of the resin boxes 5 in the rotation axis direction, even after the resin material is filled into the resin boxes, it is possible to insert the sensor wire 73 into between the snap pieces 58a and 58b.

Furthermore, since the sensor wire 73 is held by the snap pieces 58a and 58b for fixing the holder bracket 72 holding the thermistor element 71, it is not required to add a new component. Therefore, it is possible to reduce the size of the stator 3 and to prevent the manufacturing cost of the stator 3 from increasing.

<Second Embodiment>

Next, a different point of a method of holding the sensor wire 73 according to a second embodiment from the first embodiment will be described with reference to FIG. 22. At each of the rear end portions of the side plates 53 and 54 of each resin box 5A, a holder engagement portion 55 (an example of a connection portion) protrudes downward. The holder engagement portions 55 are formed to extend from the bottom plate portions 51 (an example of a bottom portion) toward the coils 42 when the resin boxes 5 are attached to the division cores 41. Similarly to the case of the first embodiment, the rear end portions of the holder engagement portions 55 are inserted into the locking holes 432 of the bobbins 43.

In the holder engagement portions, at surfaces opposing the coils 42, notch portions 551 (an example of a recess portion) are formed. The notch portions 551 are provided to have curved surfaces and to form predetermined spaces between the notch portions 551 and the coils 42.

Figure 22:
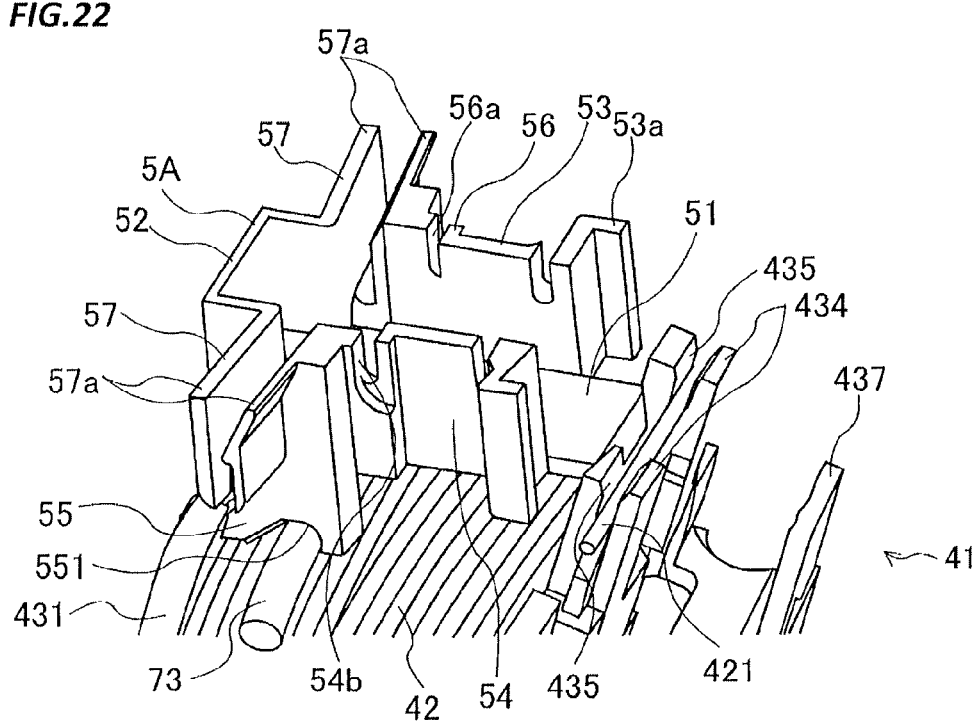
FIG. 22 is a perspective view illustrating a state in which a sensor wire is pinched between a holder engagement portion of a resin box and a coil according to a second embodiment disclosed here.

As shown in FIG. 22, the sensor wire 73 drawn from the holder bracket 72 is accommodated in the notch portions 551, so as to be interposed between the notch portions 551 and the coils 42, such that the sensor wire 73 is held.

Further, as shown in FIG. 22, in the resin boxes 5A according to the second embodiment, the snap pieces 58a and 58b are not formed at the upper end portions of the terminal mounting portions 57.

According to the second embodiment, since the notch portions 551 are formed at the holder engagement portions 55 extending from the bottom plate portions 51 of the resin boxes 5A toward the coils 42, and the sensor wire 73 accommodated in the notch portions 551 is interposed and held between the holder engagement portions 55 and the coils 42, it is possible to hold the sensor wire 73 in dead spaces between the resin boxes 5A and the coils 42, and to prevent the size of stator 3 from increasing in the rotation axis direction.

Further, since the sensor wire 73 can be held only by the resin boxes 5A and the coils 42, it is not required to add a new component. Therefore, it is possible to present the cost of the stator 3 from increasing.

Furthermore, since it is possible to minimize a change in the resin boxes 5A, it might be possible to use related-art forming molds for the resin boxes 5, and to further reduce the cost of the stator 3.

<Other Embodiments>

The principles, preferred embodiment and mode of operation of the present invention have been described in the foregoing specification. However, the invention which is intended to be protected is not be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within spirit and scope of the present invention as defined in the claims, be embraced thereby.

The stator according to the embodiments can be applied to a synchronous motor, an induction motor, a DC motor, or all other rotating electrical machines.

The snap pieces 58a and 58b or the notch portions 551 for holding the sensor wire 73 may be formed at the surrounding portions 612 of the bus ring 6.

On the stator 3, only one of the oil temperature sensor 7a and the coil temperature sensor 7b may be provided.

Inside the accommodating spaces TS, either the connection portions of the high-voltage-side end portions 421 of the coils 42 and the power supply terminals 64, or the connection portions of the low-voltage-side end portions 422 of the coils 42 and the neutral terminals 44 may be accommodated.

Also, for each division core 41, one accommodating space TS may be formed by a resin box 5 and another accommodating space TS may be formed only by a surrounding portion 612 of the bus ring 6, so that the connection portions of the high-voltage-side end portions 421 of the coils 42 and the power supply terminals 64, and the connection portions of the low-voltage-side end portions 422 of the coils 42 and the neutral terminals 44 are accommodated in separate accommodating spaces TS. At either the resin boxes 5 or the surrounding portions 612 of the bus ring 6, the snap pieces 58a and 58b or the notches 622a may be formed for holding the sensor wire 73.

Further, the uses of the oil in the motor housing 11 whose temperature is detected by the oil temperature sensor 7a is not limited to the specified uses.

What is claimed is:

1. A stator of a rotating electrical machine provided in a housing, the stator comprising:
   a core unit which includes a plurality of core assemblies arranged annularly, each core assembly being wound with a coil;
   a plurality of accommodating portions which are provided to correspond to the core assemblies, each accommodating portion accommodating at least one of (i) a connection portion of end portions of adjacent coils for forming a neutral point and (ii) a connection portion of the other end portion of one of the adjacent coils and a power supply line;
   a temperature detector which detects at least one of a temperature of an oil stored in the housing and a temperature of a coil of the plurality of coils; and
   a signal line which is connected to the temperature detector for transmitting a detection signal from the temperature detector to an outside,
   wherein each of the accommodating portions includes a holding portion which holds the signal line,
   wherein the stator has an annular shape,
   wherein each of the holding portions is formed at one end portion of a corresponding accommodating portion in a rotation axis direction and pinches the signal line in a radial direction of the stator,
   wherein each of the holding portions includes a pair of snap pieces opposing each other and having flexibility, and
   wherein one of the snap pieces is longer than the other of the snap pieces in a circumferential direction of the stator.

2. The stator according to claim 1,
   wherein at least one of the accommodating portions is attached with a bracket which holds the temperature detector, and
   wherein the holding portion of the at least one of the accommodating portions is engaged with the bracket.

3. The stator according to claim 1,
   wherein each of the accommodating portions includes a bottom portion, and a connection portion extending from the bottom portion toward a corresponding coil, and the connection portion is engaged with a corresponding core assembly,
   wherein each of the holding portions includes a recess portion formed at a portion in the connection portion thereof and opposing a corresponding coil, and
   wherein the signal line is pinched between the holding portions and the coils while being accommodated in the recess portions.

4. The stator according to claim 1,
wherein each of the accommodating portions includes a bottom portion, a rear wall provided on a rear end portion of the bottom portion, a pair of side plates standing from side end portions of the bottom portion.

5. The stator according to claim 2,
wherein the bracket includes a first accommodating portion extending outward in the radial direction and a second accommodating portion extending in the rotation axis direction in a state where the bracket is attached to the core unit.

6. The stator according to claim 1,
wherein the pair of snap pieces protrudes in the rotational axis direction, and
wherein tip end portions of the snap pieces in the rotational axis direction have jaw portions protruding in a direction of being closer to each other.

* * * * *